Nov. 3, 1925.  1,560,257
P. H. JOHNSON
METHOD OF ASSEMBLING LINKS
Filed Nov. 6, 1924
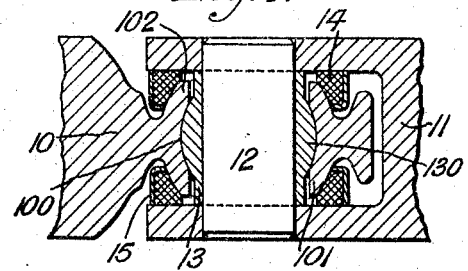
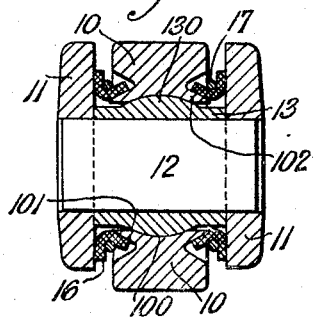
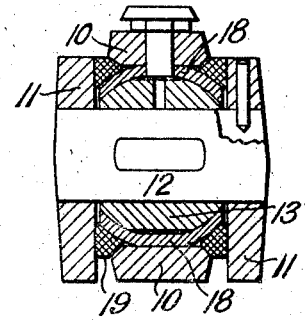
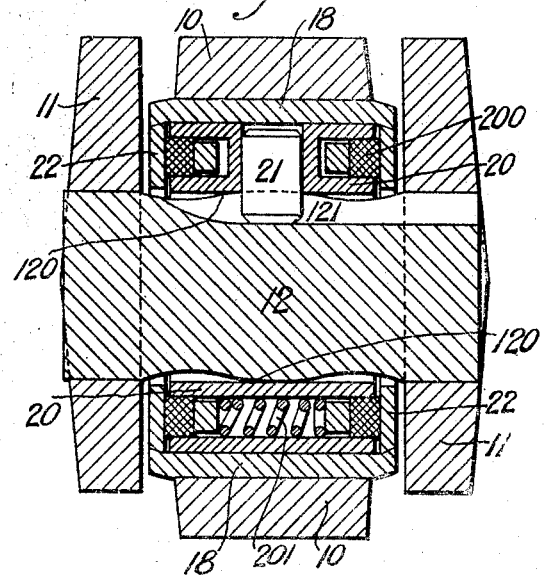
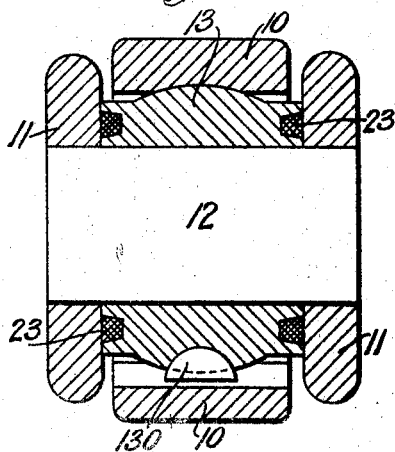
INVENTOR:
PHILIP HENRY JOHNSON,
By his Attorneys, Patented Nov. 3, 1925.

1,560,257

UNITED STATES PATENT OFFICE.

PHILIP HENRY JOHNSON, OF HOUNSLOW, ENGLAND, ASSIGNOR TO ROADLESS TRACTION LIMITED, OF GUNNERSBURY HOUSE, HOUNSLOW, MIDDLESEX, ENGLAND.

METHOD OF ASSEMBLING LINKS.

Application filed November 6, 1924. Serial No. 748,151.

*To all whom it may concern:*

Be it known that I, PHILIP HENRY JOHNSON, a subject of the King of Great Britain, residing at Gunnersbury House, Hounslow, Middlesex, England, have invented new and useful Improvements in and Methods of Assembling Links, of which the following is a specification.

This invention relates to a method of assembling links and is illustrated as applied to links particularly intended for connecting the track shoes of an endless track for use with vehicles. Obviously the invention is not limited to this particular employment.

According to this invention in order that adjacent links may have a limited universal movement between them a spherical member supported by the pin is provided, which spherical member engages with another member having a spherical seating, the seating member being supported by the male end of the link. Such an arrangement may consist of a bush having a spherical portion which fits over the pin and is housed in a spherical seating in the male end of the link, the end of the link being machined so as to allow the bush to be inserted into it after which the sides of the link are pressed over the spherical portion of the bush. In some cases one side of the link may be machined to conform with the spherical surface of the bush, the other side being pressed over after the bush has been inserted.

Alternatively a tube may be inserted into the male end of the link, the ends of the tube being pressed over, thus avoiding the pressing over of the material of the link itself.

In the above arrangements the larger or rotational movements to which the joint is subjected are provided for between the pin and the inner diameter of the bush and the smaller or universal movement between the link and the outer spherical surface of the bush. Such movements may be reversed by using a pin having a partly spherical portion about the centre of its length and by fitting over this pin a ring the rotational movement of which on the pin is prevented for example by a stud which fits into a slot in the pin. Thus no rotary movement is permitted between the pin and the bush but the form of the pin permits of the small universal movement required. The larger or rotational movement required is obtained between the outer diameter of the ring and the male end of the link itself, or between the ring and a housing in the form of a steel ring secured in the male end of the link. At each side of the first mentioned ring are recesses for the reception of packing material and the mouths of these recesses are closed and the ring retained in place either by pressing the material of the link over the ends of the ring or preferably by washers held in position in the male end of the link. This may be effected by bending over the material of the link or by bending down the ends of the outer steel ring which acts as a housing. Springs may be used in the recesses to press the packing material outwards.

The first mentioned arrangements of joints are sealed to prevent the entrance of dirt and for this purpose a ring of felt, cork or the like, is provided between the outer sides of the spherical surface of the pressed over part of the link and the inner surface of the female end of the link. The rings of sealing material are enclosed in a housing ring preferably of steel, both sets of rings being of such a size that the necessary amount of movement is allowed.

Alternatively washers of leather or like material may be held by spring rings in engagement with the outer spherical surfaces of the male end of the link and the inner surfaces of the female end. In substitution for or in addition to the above seals, the ends of the bushes may be recessed, sealing rings being inserted into the recesses.

The accompanying drawings illustrate joints for endless tracks made in accordance with this invention. Figures 1 and 2 are sections at right angles showing one form of joint and Figures 3, 4 and 5 are sections of modified forms.

In all the figures of the drawings 10 are the male ends of the links and 11 the female ends connected together by a pin 12.

In Figures 1 and 2 a bush 13 having a spherical portion 130 fits over the pin 12 and is housed in a spherical seating 100 in the male end 10 of the link. The end of the link is machined to allow the bush 13 to be inserted into it after which the sides 101 and 102 of the link 10 are pressed over the spherical portion of the bush.

Alternatively one of the sides of the link 10 is pressed down and machined before the bush 13 is inserted.

In Figure 1 washers 14 of felt or the like enclosed in metal housing rings 15 are provided to prevent the entrance of dirt.

In Figure 2 washers of leather 16 held in engagement by spring rings 17 are provided for the same object.

The arrangement shown in Figure 3 is similar to that shown in Figures 1 and 2 except that a metal tube 18 is inserted between the bush 13 and the link 10, the ends of the tube 18 being pressed over when the bush 13 is in place so avoiding the pressing over of the material of the link itself. One end of the tube 18 may be pressed over for the insertion of the bush as above described in connection with Figures 1 and 2. Washers 19 of felt are provided to prevent the entrance of dirt.

In the above arrangements the larger or rotational movements to which the joint is subjected are provided between the pin and the inner diameter of the bush and the smaller or universal movement between the link and the outer spherical surface of the bush. Such movements may be reversed as shown in the joint illustrated in Figure 4 in which the pin 12 has a spherical portion 120 and over the pin 12 is fitted a ring 20, the rotational movement of the pin being prevented by a stud 21 which fits in a slot 121 in the pin 12. As in Figure 3 a tube 18 is inserted between the ring 20 and the ends of the link 10. At each side of the ring 20 are recesses for the reception of packing material 200 pressed outwards by springs 201, the mouths of the recesses being closed and the ring retained in position by washers 22 held in position by the bent over ends of the tube 18.

Figure 5 shows an arrangement in which sealing rings 23 are carried in the ends of the bush 13 and bear against the inner surface of the female end 11 of the link. 130 is a projection which engages with a groove in the end 10 and prevents rotation.

What I claim is:—

1. The process of connecting together links having male and female ends which comprises inserting a spherical member into a spherical seating member in said male end, bending down a portion of the spherical seating member to hold the spherical member in place, positioning the male end within the female end, and passing a pin through said ends.

2. The process of connecting together links having male and female ends which comprises inserting a spherical member into a spherical seating member in said male end, bending down two sides of the spherical seating member to hold the spherical member in place, positioning the male end within the female end, and passing a pin through said ends.

3. The process of connecting together links having male and female ends which comprises inserting a spherical member into a spherical seating member in said male end, bending down a portion of the spherical seating member to hold the spherical member in place, placing washers around said male end which will engage the sides of the female end when the parts are assembled, positioning the male end within the female end, and passing a pin through said ends.

In testimony that I claim the foregoing as my invention I have signed my name this 24th day of October, 1924.

PHILIP HENRY JOHNSON.